United States Patent
Moyes (10) Patent No.: US 12,038,847 B2
(45) Date of Patent: Jul. 16, 2024

(54) A/D BIT STORAGE, PROCESSING, AND MODES

(71) Applicant: Advanced Micro Devices, Inc., Santa Clara, CA (US)

(72) Inventor: William A. Moyes, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/952,933

(22) Filed: Sep. 26, 2022

(65) Prior Publication Data

US 2024/0104023 A1    Mar. 28, 2024

(51) Int. Cl.
*G06F 12/1009* (2016.01)
*G06F 12/0811* (2016.01)

(52) U.S. Cl.
CPC ...... *G06F 12/1009* (2013.01); *G06F 12/0811* (2013.01)

(58) Field of Classification Search
CPC .......................... G06F 12/1009; G06F 12/0811
See application file for complete search history.

(56) References Cited

U.S. PATENT DOCUMENTS

| | | | | |
|---|---|---|---|---|
| 5,329,629 A | * | 7/1994 | Horst | G06F 12/1027 365/49.1 |
| 5,432,917 A | * | 7/1995 | Parikh | G06F 12/122 711/E12.071 |
| 5,493,663 A | * | 2/1996 | Parikh | G06F 12/123 711/E12.072 |
| 7,519,781 B1 | * | 4/2009 | Wilt | G06F 12/126 345/565 |
| 7,809,904 B1 | * | 10/2010 | Wilt | G06F 12/126 711/159 |

OTHER PUBLICATIONS

Neel Nayu, Nested Paging in bhyve, Feb. 2014, freeBSD (Year: 2014).*

* cited by examiner

*Primary Examiner* — Ryan Bertram
(74) *Attorney, Agent, or Firm* — FIG. 1 Patents (57) ABSTRACT

A/D bit storage, processing, and mode management techniques through use of a dense A/D bit representation are described. In one example, a memory management unit employs an A/D bit representation generation module to generate the dense A/D bit representation. In an implementation, the A/D bit representation is stored adjacent to existing page table structures of the multilevel page table hierarchy. In another example, memory management unit supports use of modes as part of A/D bit storage.

12 Claims, 6 Drawing Sheets

602
Receive an input by a memory management unit, the input specifying a mode of a plurality of modes to manage A/D bit storage for use in mapping virtual memory addresses with physical memory addresses

604
Set the mode responsive to the input

606
Manage data migration involving the physical memory addresses in the physical memory based on the mode

FIG. 6

A/D BIT STORAGE, PROCESSING, AND MODES

BACKGROUND

Virtual memory is a technique to manage the use of shared physical memory. Virtual memory supports a variety of different functionality. Examples of this functionality include expansion of an amount of storage made available to applications beyond that which is actually available in the physical memory, offload memory management from applications and operating systems, use of a variety of different types of memory without the applications being made aware, support memory optimization, address memory fragmentation, and so forth. To do so, virtual memory is conventionally managed through the use of pages to manage translation between virtual addresses and physical memory addresses. Conventional techniques, however, encounter challenges resulting from techniques used to reduce an amount of space used by the pages to support this translation, which hinders operation of devices that use these management techniques.

BRIEF DESCRIPTION OF THE DRAWINGS

The detailed description is described with reference to the accompanying figures.

DETAILED DESCRIPTION

Virtual memory is a technique used to expand functionality made available by devices to manage data storage. To support this, a memory management unit is tasked with translation between virtual memory addresses and physical memory addresses, e.g., between an operating system executed on a central processing unit with physical addresses in physical memory. The memory management unit divides a virtual address space into pages tables and page table entries as part of a multilevel page table hierarchy. This technique is performed to reduce an amount of memory used to implement translation by the memory management unit. However, this technique also introduces challenges in a variety of different usage scenarios, thereby resulting in suboptimal operation of devices that implement these techniques.

In one such example, pages of the multilevel page table hierarchy maintain "A" and "D" bits. An "A" bit is used to indicate access to a memory location in the page and is usable to prior access to the page and in some instances identify an "age" of the page. A "D" bit, also referred to as a "dirty" bit, indicates whether a write operation has been performed to any physical memory address corresponding to the page. In a data management scenario, for instance, the "A" bit is usable by a memory management unit to indicate a least recently used (LRU) page is to be swapped from random access memory to mass storage. The "D" bit is used such that when a swap is indicated, if the "D" bit is set (and therefore physical addresses corresponding to the page have been changed), data of the page is written out to mass storage, e.g., non-volatile memory. However, if the "D" bit is not set, the page is not written out to mass storage as the data is not changed. Other scenarios are also contemplated, examples of which include data migration scenarios involving management of inference execution, optimization of virtual machine implementations involving movement between physical devices, and so forth.

In conventional techniques, however, storage of A/D bits is sparse. In one real-world example, storage of A/D bits consumes one or two bits in a sixty-four-bit page table entry of interest. This results in inefficient use of memory bandwidth resources, prevents use of native bit vector handling instructions (i.e., BSF, POPCNT, AND/OR/XOR, etc.) for processing multiple pages in a parallel, and so forth.

To solve these problems, a memory management unit is configured to implement A/D bit storage, processing, and mode management techniques through use of a "dense" A/D bit representation, e.g., as a dense bit vector representation. This supports faster scanning with increased bandwidth efficiency in a manner that implements increases in spatial locality of virtual memory accesses. Further, the A/D bit representation is generated in an efficient manner with minimal consumption of caching resources.

In one example, the memory management unit employs an A/D bit representation generation module to generate the dense A/D bit representation. To do so, a table walker module is utilized to walk a multilevel page table hierarchy to determine a physical memory address corresponding to a virtual memory address. As part of this, accessed bits are set, e.g., set as "clear." This is performable, for instance, to set values of A/D bits stored as part of page table entries (PTEs) in respective page tables. These values are also usable as a basis to generate a dense bit vector as the A/D bit representation having a plurality of values of A/D bits associated with a plurality of page tables. This reduces bandwidth that is conventionally consumed by accessing page table entries individually for each memory management operation, e.g., data migration for inference management, and so forth. These techniques also support use of bit parallel instructions and thereby improve operation of devices that implement these techniques, which is not possible in conventional scenarios.

A variety of other functionality is also made possible by these techniques to overcome challenges and inefficiency of conventional A/D bit management. In an implementation, the A/D bit representation is stored as a "dense" representation adjacent to existing page table structures of the multilevel page table hierarchy, which reduces and even eliminates use of additional pointers in the hierarchy. In one example, the A/D bit representation is stored as part of a page-directory table of the multilevel page table hierarchy that is "above" a level of the page tables, thereby reducing individual access to each of the tables.

In another example, the memory management unit supports use of modes as part of A/D bit storage. In a first instance, a mode selector is implemented to support switching between use of the A/D bit representation (e.g., a dense mode) and conventional storage of A/D bits, e.g., to support legacy usage as stored within page table entries maintained within respective page tables. In a second instance, a model selector is used to support generation of the A/D bit representation such that the "A" bits and the "D" bits are maintained independently. This supports a variety of usage scenarios while maintaining backwards compatibility, such as to support use of page use profiling without disturbing exiting software execution, optimize system performance, and so forth. In a third instance, a model selector is used to separately enable tracking of "A" or "D" bits as part of the A/D bit representation, i.e., to specify one or the other. A variety of other examples are also contemplated, further discussion of which is included in the following discussion and shown in corresponding figures.

In some aspects, the techniques described herein relate to a method including receiving a virtual memory address, retrieving a physical memory address that corresponds to the virtual memory address by walking a plurality of page tables, setting a value of an A/D bit as part of an A/D bit representation having a plurality of A/D bits, and storing the A/D bit representation.

In some aspects, the techniques described herein relate to a method, wherein an "A" bit of the A/D bits indicates prior access to a page table entry of a respective page table of the plurality of page tables, and a "D" bit of the A/D bits indicates occurrence of a write operation involving the page table entry of the respective page table.

In some aspects, the techniques described herein relate to a method, wherein the plurality of page tables is included as part of a multilevel page table hierarchy and the identifying includes locating the A/D bits by walking the multilevel page table hierarchy.

In some aspects, the techniques described herein relate to a method, wherein the multilevel page table hierarchy includes a plurality of levels, including respectively a plurality of page-directory-pointer tables, a plurality of page-directory tables, and the plurality of page tables.

In some aspects, the techniques described herein relate to a method, wherein the storing includes storing the A/D bit representation as part of the multilevel page table hierarchy.

In some aspects, the techniques described herein relate to a method, wherein the storing includes extending a level of the multilevel page table hierarchy for inclusion of the A/D bit representation.

In some aspects, the techniques described herein relate to a method, wherein the storing includes storing the A/D bit representation as part of the extended level.

In some aspects, the techniques described herein relate to a method, wherein the storing the A/D bit representation includes storing "A" bits and "D" bits independently of each other as separate vectors.

In some aspects, the techniques described herein relate to a device including a memory management unit having a mode selector module configured to support a plurality of modes to manage A/D bit storage for use in mapping virtual memory addresses with physical memory addresses in physical memory, the plurality of modes including: a first mode in which values of A/D bits are maintained within a plurality of page tables to perform the mapping, and a second mode in which an A/D bit representation is generated as a vector by identifying the values of the A/D bits included within the plurality of page tables.

In some aspects, the techniques described herein relate to a device, wherein an "A" bit of the A/D bits indicates prior access to a page table entry of a respective page table of the plurality of page tables, and a "D" bit of the A/D bits indicates occurrence of a write operation involving the page table entry of the respective page table.

In some aspects, the techniques described herein relate to a device, wherein the plurality of page tables are included as part of a multilevel page table hierarchy.

In some aspects, the techniques described herein relate to a device, wherein the multilevel page table hierarchy includes a plurality of levels, including respectively a plurality of page-directory-pointer tables, a plurality of page-directory tables, and the plurality of page tables.

In some aspects, the techniques described herein relate to a device, wherein the second mode causes the A/D bit representation to be stored as part of the multilevel page table hierarchy.

In some aspects, the techniques described herein relate to a device, wherein the second mode causes "A" bits of the A/D bit representation to be stored independently of "D" bits.

In some aspects, the techniques described herein relate to an apparatus including: a memory management unit configured to set a mode of a plurality of modes to manage A/D bit storage for use in mapping virtual memory addresses with physical memory addresses in physical memory based on an input.

In some aspects, the techniques described herein relate to an apparatus, wherein the mode causes generation of an A/D bit representation as a vector by identifying values of the A/D bits included within a plurality of page tables of a multilevel page table hierarchy.

In some aspects, the techniques described herein relate to an apparatus, wherein the mode causes the A/D bit representation to be stored as part of the multilevel page table hierarchy.

In some aspects, the techniques described herein relate to an apparatus, wherein the mode causes generation of a vector of "A" bits identified from a plurality of page tables, the "A" bits indicative of an age of access to a page table entry of a respective said page table.

In some aspects, the techniques described herein relate to an apparatus, wherein the mode causes generation of a vector of "D" bits identified from a plurality of page tables, the "D" bits indicative of occurrence of a write operation involving a respective page table entry of the respective said page table.

In some aspects, the techniques described herein relate to an apparatus, wherein the plurality of modes include a first mode in which values of A/D bits are maintained within a plurality of page tables to perform the mapping, and a second mode in which an A/D bit representation is generated as a vector by identifying the values of the A/D bits included within the plurality of page tables.

Figure 1:
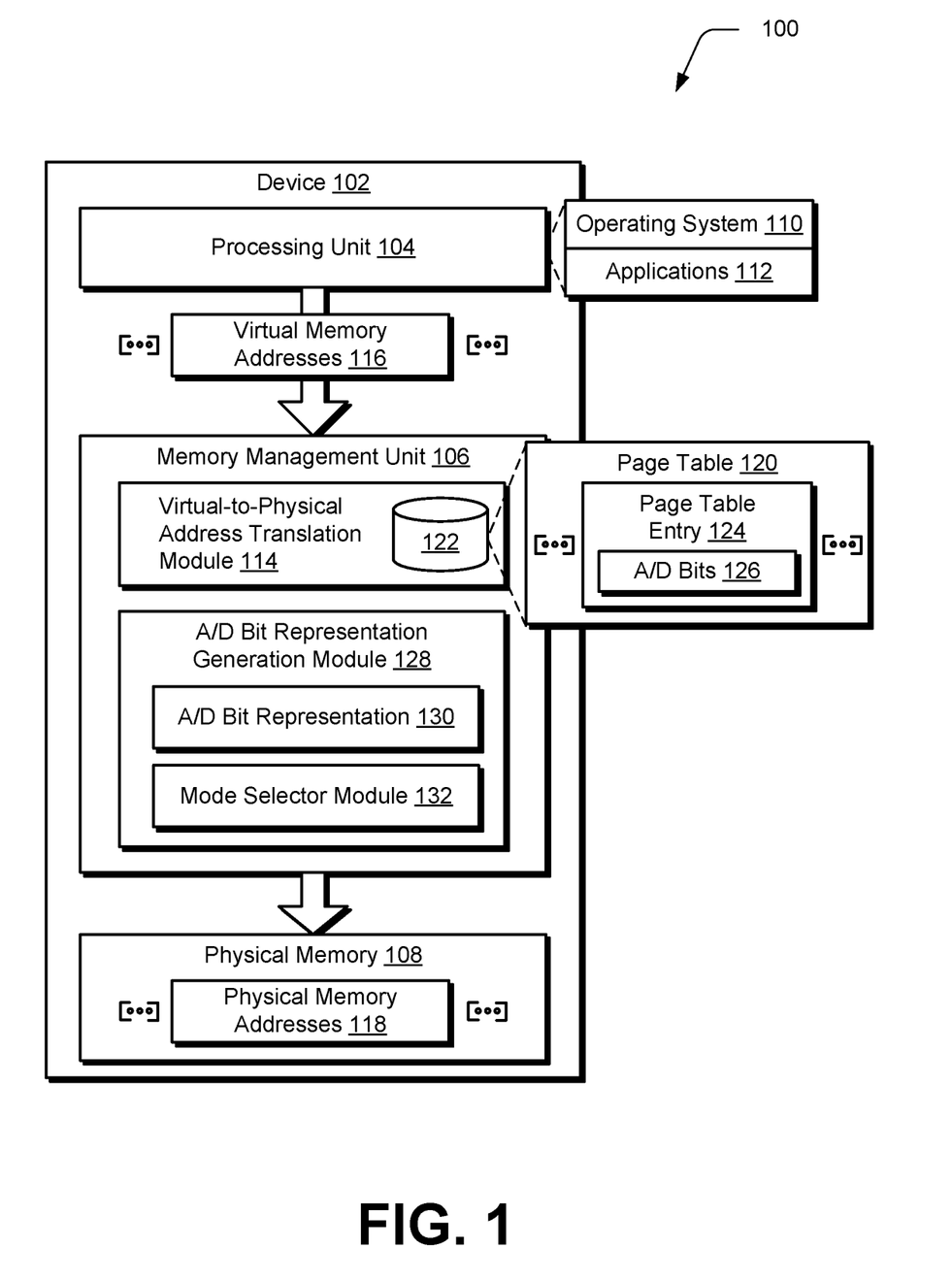
FIG. 1 is a block diagram of a non-limiting example of a device configured to implement A/D bit storage, processing, and configuration techniques.

FIG. 1 is a block diagram of a non-limiting example 100 of a device 102 configured to implement A/D bit representation generation techniques. These techniques are usable by a wide range of device 102 configurations. Examples of those devices include, by way of example and not limitation, computing devices, servers, mobile devices (e.g., wearables, mobile phones, tablets, laptops), processors (e.g., graphics processing units, central processing units, and accelerators), digital signal processors, interference accelerators, disk array controllers, hard disk drive host adapters, memory cards, solid-state drives, wireless communications hardware connections, Ethernet hardware connections, switches, bridges, network interface controllers, and other apparatus configurations. Additional examples include artificial intelligence training accelerators, cryptography and compression accelerators, network packet processors, and video coders and decoders. It is to be appreciated that in various implementations, the techniques described herein are usable using any one or more of those devices listed just above and/or a variety of other devices without departing from the spirit or scope of the described techniques.

The illustrated example of the device 102 includes a processing unit 104 that is communicatively coupled (e.g., via a bus) to a memory management unit 106 that is communicatively coupled (e.g., via a bus) to physical memory 108. The processing unit 104 is configurable in a variety of ways to execute instructions to perform operations, e.g., as a central processing unit to execute an operating system 110, applications 112, and so forth. Other processing unit 104 configurations are also contemplated, examples of which include parallel processors, graphics processing units, and so forth. In one example, the memory management unit 106 is configured for I/O device usage, e.g., as an input output memory management unit (IOMMU). Although a single instance of physical memory 108 is illustrated, the physical memory 108 is representative of a variety of types of physical memory that are implementable together, e.g., volatile and non-volatile memory. The techniques described herein, for instance, are usable to improve efficiency in data migration between volatile and non-volatile memory, between virtual machines (e.g., to manage inference execution), and so forth.

The memory management unit 106, as configured, supports use of a virtual address space by the processing unit along with a physical address space of the physical memory 108. To do so, a virtual-to-physical address translation module 114 is employed to translate virtual memory addresses 116 received from the processing unit 104 to physical memory addresses 118 of the physical memory 108, and vice versa.

In order to support this translation, the virtual-to-physical address translation module 114 uses a plurality of page tables, an example of which is illustrated as page table 120. The page table 120 is maintainable in-memory 122, e.g., as part of a translation lookaside buffer (TLB), as part of a memory array, registers, and so forth to store a set of page table entries 124, also referred to as PTEs. The page table 120, for instance, includes a page table entry for each of the pages used to divide the virtual address space to map virtual memory addresses 116 to physical memory addresses 118.

The page table entries 124 include a variety of additional functionality that is usable to describe characteristics of portions of physical memory associated with a respective page, and data stored in those portions. An example of this includes A/D bits 126. As previously described, "A" bits define when a corresponding page is last accessed, and more particularly when physical memory addresses 118 associated with the page are accessed. "D" bits define whether physical memory addresses 118 of the page have been the subject of a write operation, i.e., have been "written to."

In conventional techniques, however, storage of A/D bits is sparse. In one real-world example, storage of A/D bits consumes one or two bits in a sixty-four bit page table entry of interest. This is used to minimize an amount of data consumed in supporting virtual/physical translation by configuring the pages as part of a multilevel page table hierarchy. However, this also results in inefficient use of memory bandwidth resources used to scan this hierarchy, prevents use of native bit vector handling instructions (i.e., BSF, POPCNT, AND/OR/XOR, etc.) for processing multiple pages in a parallel, and so forth.

To solve these problems, the memory management unit 106 employs an A/D bit representation generation module 128 that is configured to generate a "dense" A/D bit representation 130. The A/D bit representation 130, for instance, is configurable as a vector that includes values of A/D bits that are stored instead of (or addition to) values of A/D bits 126 stored in the page table 120 as part of a sparse representation. This dense representation as a vector supports improved scanning efficiency with increased bandwidth efficiency in a manner that implements increases in spatial locality of virtual memory accesses and is generated in an efficient manger with minimal consumption of caching resources used to maintain the A/D bit representation 130. The A/D bit representation 130, for instance, is storable as a collection of dense vectors in a look-aside type buffer that is written to when a new bit is set. If the bit is already set, it is not written to the buffer. Further discussion of generation and use of the A/D bit representation 130 is described in relation to FIGS. 2-5 in the following discussion.

The A/D bit representation generation module 128 also includes a mode selector module 132. The mode selector module 132 supports use of modes as part of A/D bit representation generation and storage. In a first instance, a mode selector module 132 is implemented to support switching between use of the A/D bit representation (e.g., a dense mode) and conventional storage of A/D bits, e.g., to support legacy usage. In a second instance, a mode selector module 132 is used to support generation of the A/D bit representation 130 such that the "A" bits and the "D" bits are maintained independently. This supports a variety of usage scenarios while maintaining backwards compatibility, such as to support use of page use profiling without disturbing exiting software execution, optimize system performance, and so forth. In a third instance, a mode selector module 132 is used to separately enable tracking of "A" or "D" bits as part of the A/D bit representation. Further discussion of generation and use of the A/D bit representation 130 is described in relation to FIGS. 2 and 6 in the following discussion.

Figure 2:
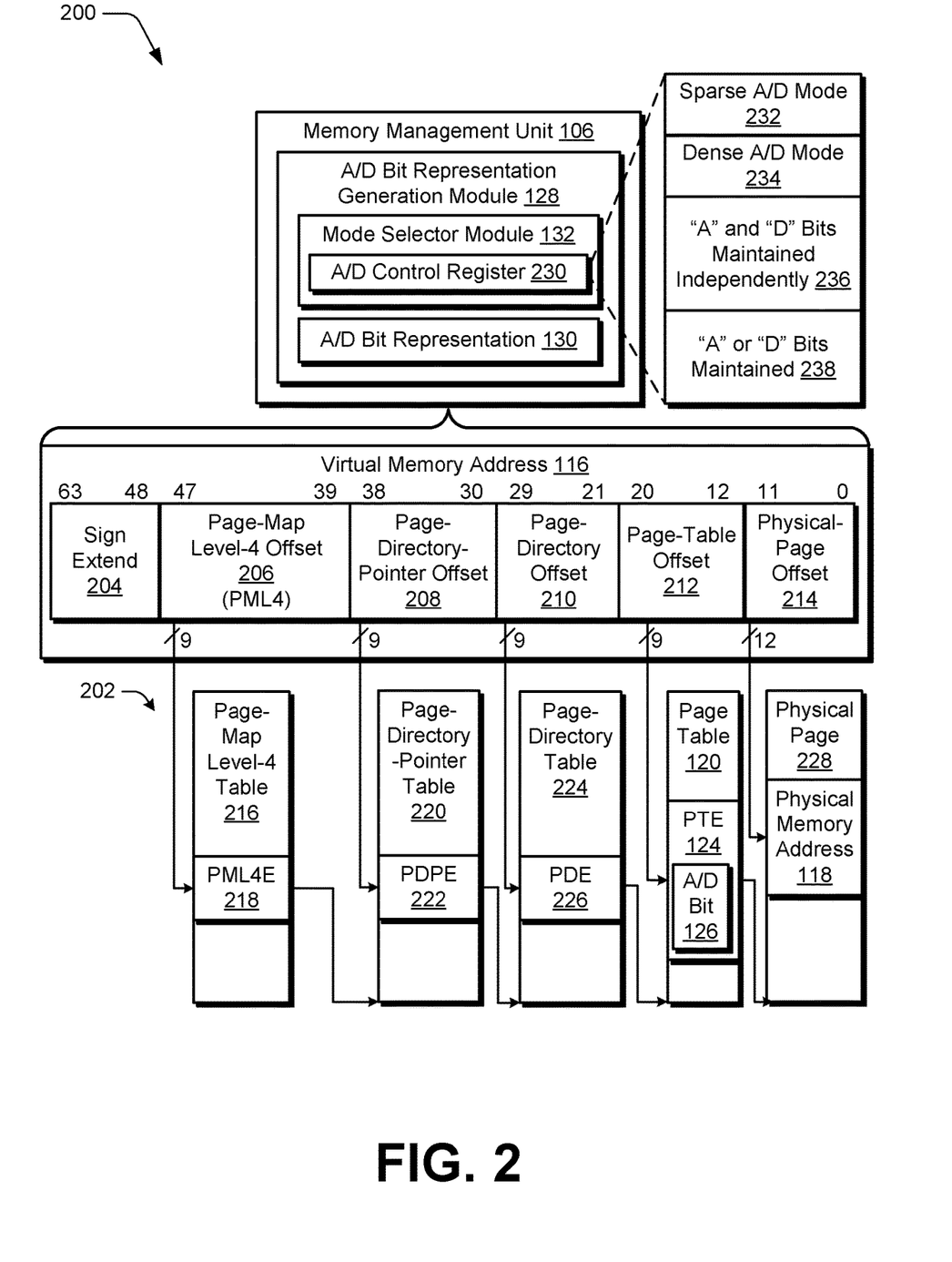
FIG. 2 is a block diagram of a non-limiting example of virtual memory address to physical memory address translation as implemented by a memory management unit of FIG. 1 using a multilevel page table hierarchy.

FIG. 2 is a block diagram of a non-limiting example 200 of virtual memory address 116 to physical memory address 118 translation as implemented by a memory management unit 106 of FIG. 1 using a multilevel page table hierarchy 202. As described above, the memory management unit 106 is configured to translate a virtual memory address 116 to locate a corresponding physical memory address 118. In the illustrated example, the virtual memory address 116 is configured using offsets to locate entries in corresponding tables of the multilevel page table hierarchy 202. The virtual memory address 116, for instance, includes a sign extend 204 portion followed by a page-map level-4 offset 206, a page-directory-pointer offset 208, a page-director offset 210, a page-table offset 212, and a physical page offset 214.

The multilevel page table hierarchy 202 includes a first level having a corresponding page-map level-4 table 216 that includes page-map level-4 entries (PML4E) 218 and a second level having a page-directory-point table 220 that includes page-directory-point entries (PDPE) 222. A third level of the multilevel page table hierarchy 202 includes a page-directory table 224 having page directory entries (PDE) 226, a fourth level that includes the page table 120 having the page table entries 124, and a fifth level that includes a physical page 228 having physical memory addresses 118. Therefore, offsets defined as part of the virtual memory address 116 are mapped to respective levels of the multilevel page table hierarchy 202.

As depicted, conventional techniques to locate a value of an A/D bit 126 in the multilevel page table hierarchy 202 involves navigation through multiple levels for each instance, which consumes significant amounts of bandwidth. Accordingly, the A/D bit representation generation module 128 is configured to generate an A/D bit representation 130 of these values. In this way, tasks such as data migration as part of managing implementation of virtual machines and corresponding interference workloads is performable with increased efficiency.

Figure 3:
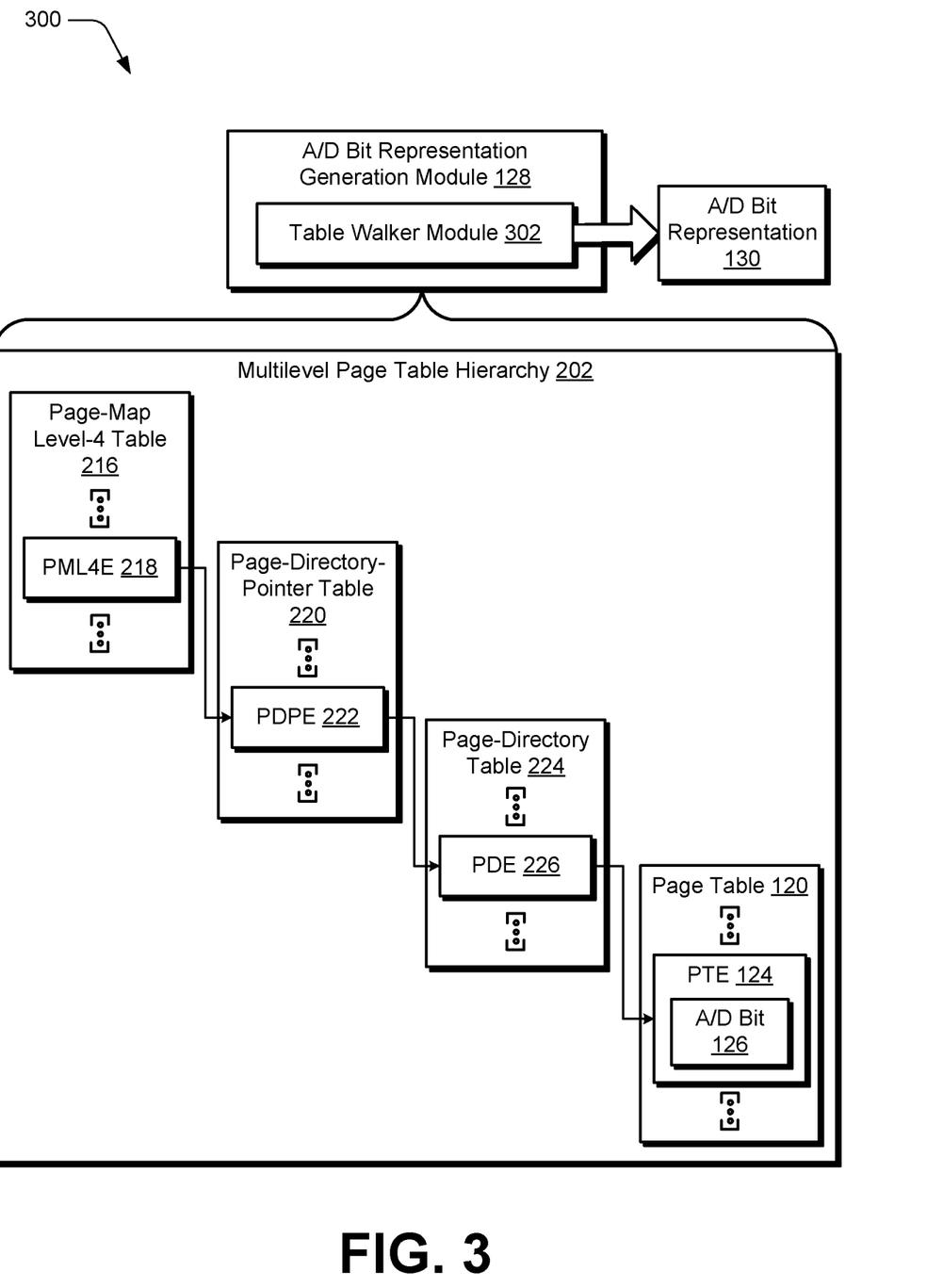
FIG. 3 is a block diagram of a non-limiting example of generation of an A/D bit representation by the A/D bit representation generation module by walking a multilevel page table hierarchy of FIG. 2.

FIG. 3 is a block diagram of a non-limiting example 300 of generation of an A/D bit representation 130 by the A/D bit representation module 128 by walking the multilevel page table hierarchy 202 of FIG. 2. The A/D bit representation generation module 128 leverages a table walker module 302. The table walker module 302 is representative of functionality that is otherwise used by the memory management unit 106 to walk levels of the multilevel page table hierarchy 202 to locate and identify physical memory addresses that corresponding to virtual memory addresses. To do so, the table walker module 302 walks the multilevel page tale hierarchy 202 from root to leaf to determine a physical address stored in the leaf. As part of this, values of A/D bits 126 are also set for corresponding page table entries 124.

In the techniques and system described herein, this functionality is augmented to also set accessed bits as part of the dense A/D bit representation 130. The values of the A/D bits, for instance, are also used by the A/D bit representation generation module 128 to generate the A/D bit representation 130 as a dense bit vector, e.g., as a continuous data structure having the values of the A/D bits 126 arranged sequentially as a part, thereof. This is performable in an either/or scenario or in parallel together.

Figure 4:
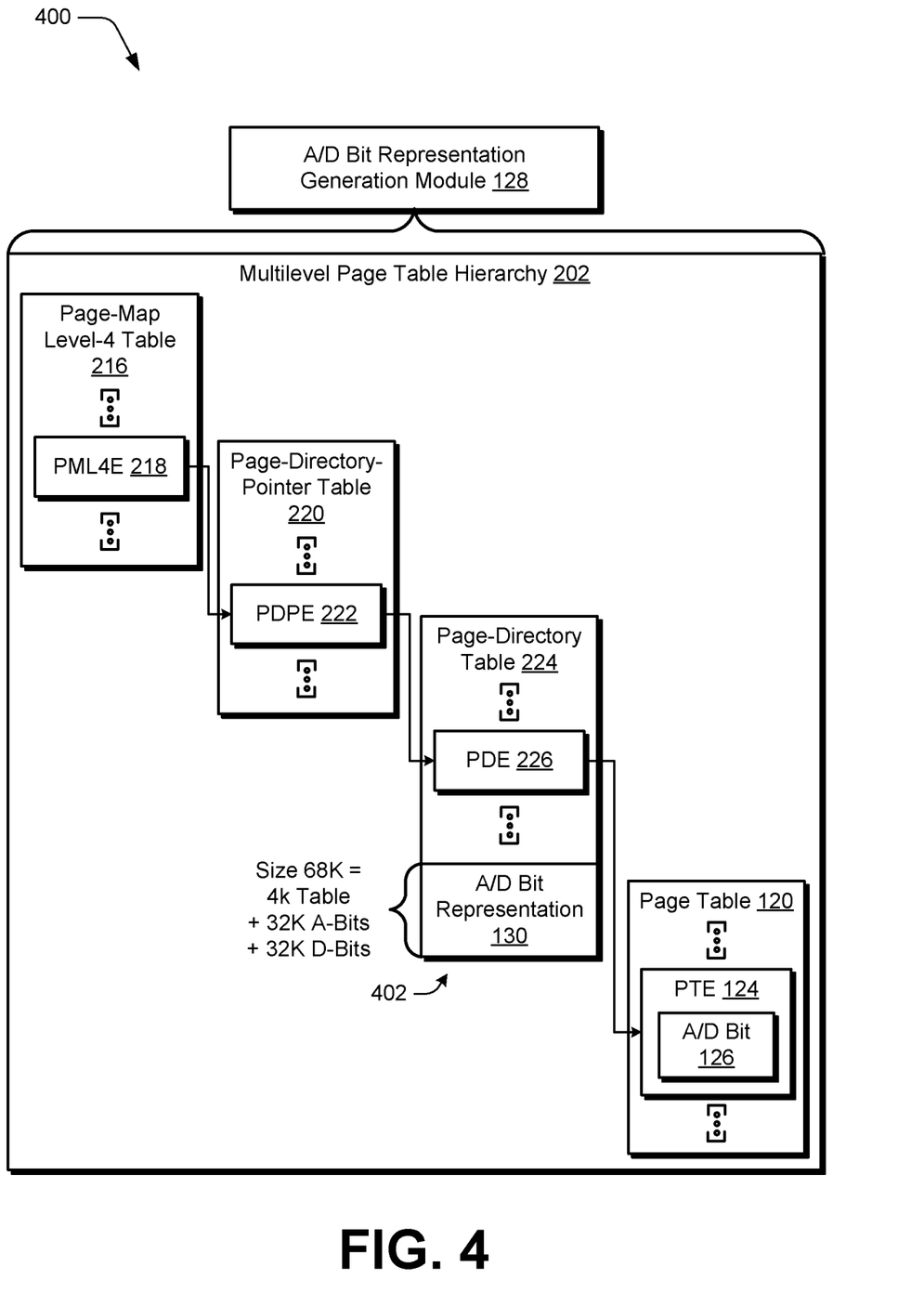
FIG. 4 is a block diagram of a non-limiting example of storing an A/D bit representation generated by an A/D bit representation module of FIG. 3 as part of a multilevel page table hierarchy.

FIG. 4 is a block diagram of a non-limiting example 400 of storing an A/D bit representation 130 by the A/D bit representation module 128 generated in FIG. 3 as part of the multilevel page table hierarchy 202. In this example, the A/D bit representation is stored as part of existing page table structures, which eliminates use of additional pointers in the multilevel page table hierarchy 202.

The A/D bit representation generation module 128, for instance, first adds an extension 402 to an existing structure, such as a page-directory table 224. As a result, the page-directory table 224 (which typically consumes four kilobytes of space) is extended in this example to sixty-eight kilobytes to accommodate two 262,144-bit vectors. This supports an ability to represent the A/D bit 126 for each four-kilobyte page within one gigabyte of virtual address space covered by a page-directory table 224. In this instance, this is performed such that the table remains at a multiple of four kilobytes. In an implementation, if there is a page having two megabytes in the page-directory table 224, the table walker module 302 issues a single sixty-four-bit cache line write to set each of the five hundred and twelve "A" or "D" bits that fall within the cache line that representation the two-megabyte region.

Returning again to FIG. 2, the A/D bit representation generation module 128 also includes a model selector module 132 in support of functionality to select from a plurality of different modes. To do so, the mode selector module 132 leverages an A/D control register 230 to identify which mode is selected, which is selectable by software (e.g., operating system 110, applications 112, and so forth) in order to control access to this functionality.

In an implementation, a sparse A/D mode 232 is selectable and/or set by default, e.g., to support legacy operation by software executed by the processing unit 104. In another example, a dense A/D mode 234 is selectable to support generation of the A/D bit representation 130. This is performable in one instance to maintain the A/D bit representation 130 as well as A/D bits 126 as part of the multilevel page table hierarchy 202, e.g., to also support legacy utilization. An operating system, for instance, is configurable to support "A" bit scanning for hot/cold page detection by enabling both the sparse A/D mode 232 and the dense A/D mode 234. In such an instance, a change is made to ensure that sixty-eight kilobytes are allocated to each page-directory table 224, instead of a conventional amount of four kilobytes. This results in a minimal increase (e.g., three percent growth) of overall size of the multilevel page table hierarchy 202.

Generation of the A/D bit representation 130 is also performable in a variety of ways as corresponding to a variety of modes. In one example, the A/D bit representation 130 is generated as sequential collections of A/D bits from corresponding page table entries 124 that are stored together, in order. In another example, a model is selectable to cause the "A" and "D" bits to be maintained independently 236. For example, "A" bits are maintainable on one side of the page-directory table 224 whereas "B" bits are maintained on another side of the page-directory table 224 as separate vectors. This supports separate tracking of dense "A" and "D" bits, such as to minimize memory footprint and bandwidth for live migration involving tracking of dirty pages, accessed page tracking, and so forth. In yet another example, a mode is supported in which the A/D bit representation 130 is generated to maintain "A" or "D" bits 238, solely.

As a result, the mode selector module 132 supports various usage scenarios that are usable to maintain backwards compatibility (e.g., sparse A/D mode 232), enable page use profiling without disrupting existing operating system code (e.g., sparse A/D mode 232 and dense A/D mode 234), optimizing system performance (e.g., dense A/D mode 234 or to stop A/D bit representation 130 generation altogether using a sparse A/D mode 232), and so forth.

Figure 5:
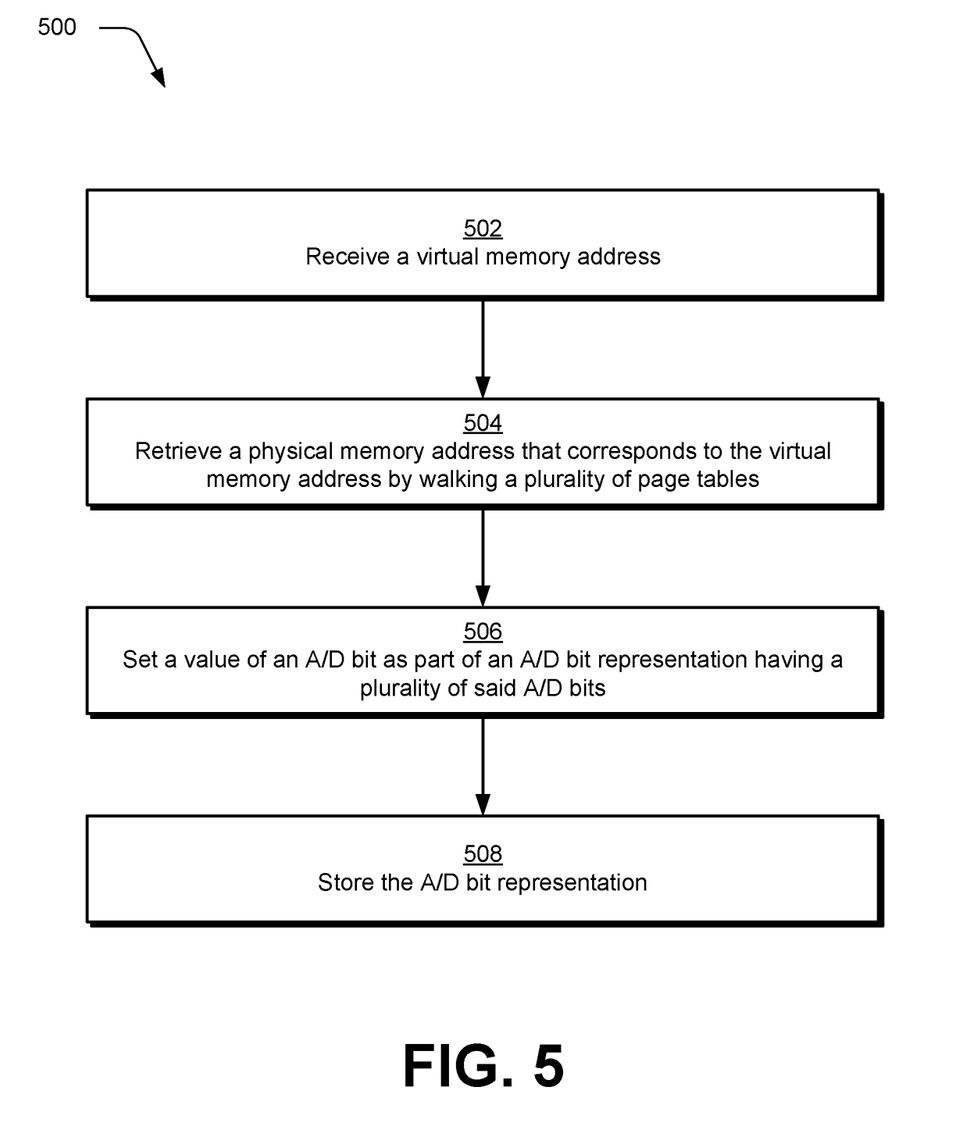
FIG. 5 depicts a procedure in an example implementation of generation of an A/D bit representation by a memory management unit.

FIG. 5 depicts a procedure 500 in an example implementation of generation of an A/D bit representation 130 by an A/D bit representation generation module 128 of a memory management unit 106.

A virtual memory address is received (block 502). By way of example, the virtual memory address 116 is received by a memory management unit 106.

A physical memory address is retrieved that corresponds to the virtual memory address by walking a plurality of page tables (block 504). By way of example, the plurality of page tables is used to map virtual memory addresses to physical memory addresses in physical memory. To do so in one example, the memory management unit 106 employs a table walker module 302 that is configured to walk tables of the multilevel page table hierarchy 202. This is used in the example of FIG. 3 to locate table entries that provide a virtual memory address to physical memory address mapping. A variety of other examples are also contemplated.

A value of an A/D bit is set as part of an A/D bit representation that includes a plurality of the A/D bits (block 506). By way of example, the A/D representation generation module 128 generates the A/D representation 130 as a vector. This is usable in one instance to store "A" and "D" from corresponding pages together and sequentially, from one page to another. In another instance this is usable to store values of "A" bits independent and separate from values of "D" bits, e.g., as separate respective vectors. A variety of other examples are also contemplated, such as to include "A" or "D" bits, solely (i.e., one or the other) as part of the A/D bit representation 130.

The A/D bit representation is stored (block 508). By way of example, a level of a multilevel page table hierarchy is expanded. The A/D bit representation generation module 128, for instance, adds an extension 402 to an existing structure, such as a page-directory table 224. As a result, the page-directory table 224 (which normally consumes four kilobytes of space) is extended in this example to sixty-eight kilobytes to accommodate two 262,144-bit vectors. This supports an ability to represent the A/D bit 126 for each four-kilobyte page within one gigabyte of virtual address space covered by a page-directory table 224. The A/D bit representation 130 is then stored within the extension 402, the sixty-four kilobytes.

Figure 6:
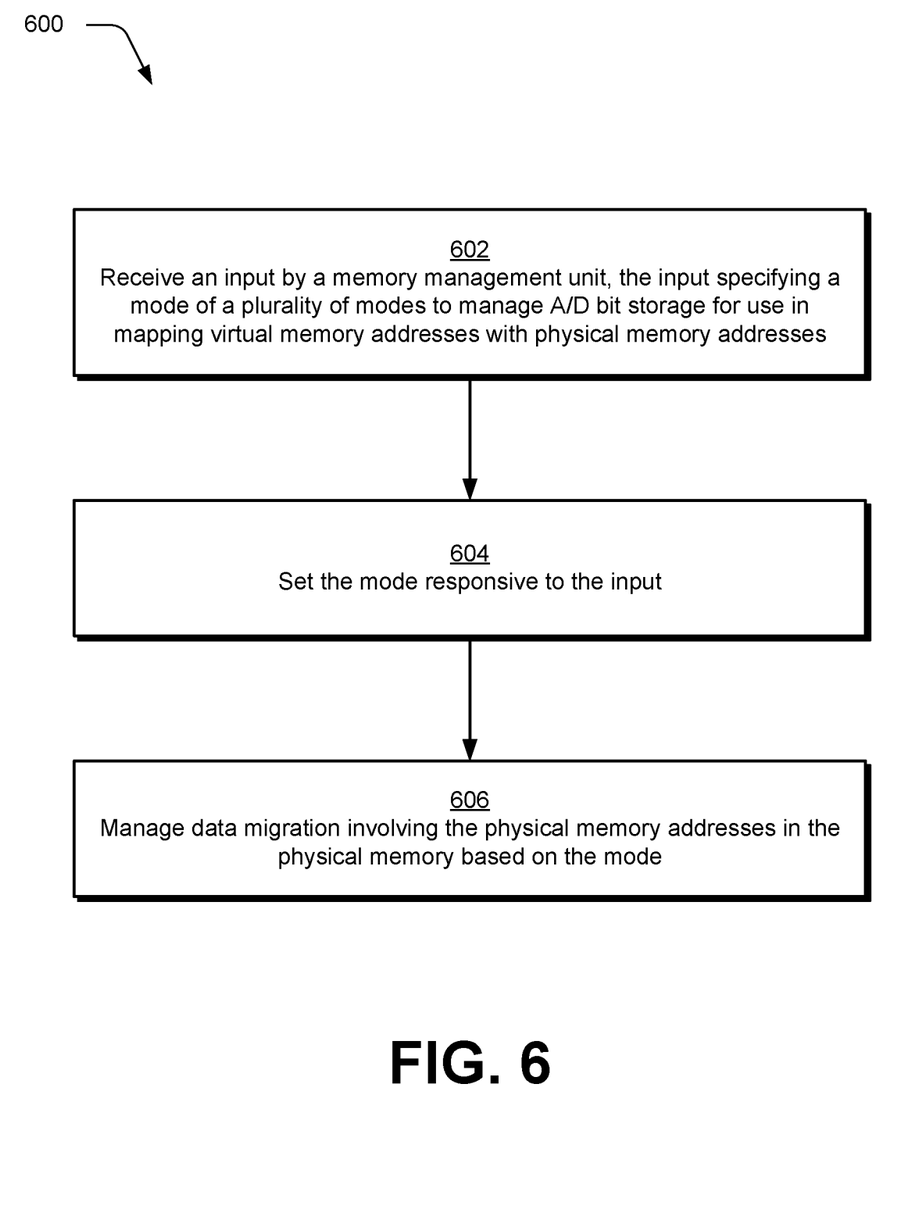
FIG. 6 depicts a procedure in an example implementation of mode usage as part of generation of an A/D bit representation by a memory management unit.

FIG. 6 depicts a procedure 600 in an example implementation of mode usage as part of generation and usage of an A/D bit representation 130 by a memory management unit 106.

An input is received by a memory management unit. The input specifies a mode of a plurality of modes to manage A/D bit storage for use in mapping virtual memory addresses with physical memory addresses in physical memory (block 602). By way of example, the input is originated through execution of software by the processing unit 104, e.g., an operating system 110, applications 112, and so forth. Other examples are also contemplated, such as through use of an input output memory management unit (IOMMU).

The mode is set responsive to the input (block 604). By way of example, the mode selector module 132 leverages an A/D control register 230 to identify which mode is selected. A variety of modes are selectable. In a first example, a sparse A/D mode 232 is selected to support legacy operation by software executed by the processing unit 104. In a second example, a dense A/D mode 234 is selected to support generation of the A/D bit representation 130. In another example, a mode is selectable to cause the "A" and "D" bits to be maintained independently 236. For example, "A" bits are maintainable on one side of the page-directory table 224 whereas "D" bits are maintained on another side of the page-directory table 224. In a fourth example, a mode is supported in which the A/D bit representation 130 is generated to maintain "A" or "D" bits 238, solely.

Data migration is managed involving the physical memory addresses in the physical memory based on the mode (block 606). By way of example, the "A" and "D" bits are maintainable in a variety of ways. Therefore, data migration techniques (e.g., between volatile and non-volatile memory, for instance management of real time and best effort inferences, and so on) are configurable to leverage this functionality to improve scanning of A/D bits. As a result, these techniques are usable to conserve 32 to 64 times the bandwidth in comparison with conventional A/D bit scanning techniques.

The various functional units illustrated in the figures and/or described herein (including, where appropriate, the processing unit 104, the memory management unit 106, and the physical memory 108) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Additional examples include artificial intelligence training accelerators, cryptography and compression accelerators, network packet processors, and video coders and decoders.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A device comprising:
   a memory management unit having a mode selector module configured to support a plurality of modes to manage A/D bit storage for use in mapping virtual memory addresses with physical memory addresses in physical memory, the plurality of modes including:
   a first mode in which values of A/D bits are maintained within a plurality of page tables to perform the mapping; and
   a second mode in which an A/D bit representation is generated as a vector by identifying the values of the A/D bits included within the plurality of page tables.

2. The device of claim 1, wherein:
   an "A" bit of the A/D bits indicates prior access to a page table entry of a respective page table of the plurality of page tables; and
   a "D" bit of the A/D bits indicates occurrence of a write operation involving the page table entry of the respective page table.

3. The device of claim 1, wherein the plurality of page tables are included as part of a multilevel page table hierarchy.

4. The device of claim 3, wherein the multilevel page table hierarchy includes a plurality of levels, including respectively a plurality of page-directory-pointer tables, a plurality of page-directory tables, and the plurality of page tables.

5. The device of claim 4, wherein the second mode causes the A/D bit representation to be stored as part of the multilevel page table hierarchy.

6. The device of claim 4, wherein the second mode causes "A" bits of the A/D bit representation to be stored independently of "D" bits.

7. An apparatus comprising:
   a memory management unit configured to set a mode of a plurality of modes to manage A/D bit storage for use in mapping virtual memory addresses with physical memory addresses in physical memory based on an input.

8. The apparatus of claim 7, wherein the mode causes generation of an A/D bit representation as a vector by identifying values of the A/D bits included within a plurality of page tables of a multilevel page table hierarchy.

9. The apparatus of claim 8, wherein the mode causes the A/D bit representation to be stored as part of the multilevel page table hierarchy.

10. The apparatus of claim 7, wherein the mode causes generation of a vector of "A" bits identified from a plurality of page tables, the "A" bits indicative of an age of access to a page table entry of a respective said page table.

11. The apparatus of claim 7, wherein the mode causes generation of a vector of "D" bits identified from a plurality of page tables, the "D" bits indicative of occurrence of a write operation involving a respective page table entry of the respective said page table.

12. The apparatus of claim 7, wherein the plurality of modes include:
   a first mode in which values of A/D bits are maintained within a plurality of page tables to perform the mapping; and
   a second mode in which an A/D bit representation is generated as a vector by identifying the values of the A/D bits included within the plurality of page tables.

* * * * *